Nov. 26, 1968 C. MONIN 3,413,489

FREQUENCY DIVIDER ARRANGEMENT

Filed June 8, 1965

INVENTOR
CLAUDE MONIN
BY Paul M. Craig, Jr.
ATTORNEY

United States Patent Office 3,413,489

Patented Nov. 26, 1968

3,413,489

FREQUENCY DIVIDER ARRANGEMENT

Claude Monin, Villennes-sur-Seine, France, assignor to CIT—Compagnie Industrielle des Telecommunications, Paris, France, a corporation of France Filed June 8, 1965, Ser. No. 462,198
Claims priority, application France, June 19, 1964, 978,963
12 Claims. (Cl. 307—225)

ABSTRACT OF THE DISCLOSURE

Frequency divider having a magnetostatic relay controlled by an electronic divider circuit to operate in a binary manner, the electronic divider circuit including a pair of capacitor charge and discharge circuits having matched impedance characteristics and being respectively coupled to said magnetostatic relay by first and second control windings having a ratio of turns which provides an excess of control of said first control winding over said second control winding sufficient to actuate the magnetostatic relay, and means for selectively completing connection of said capacitor charge and discharge circuits to a common source of potential.

The present invention relates in general to frequency divider arrangements and more particularly to a binary counter utilizing a magnetostatic relay in an extremely simple arrangement.

Such devices, which are well-known in electronics, are generally obtained from transistor bistable flip-flops, each flip-flop being made up of two transistors connected in such a way that when the first transistor is made conducting, the second one is blocked, and vice versa. It is obvious, under these conditions, that a given flip-flop terminal delivers one pulse for only two incoming pulses.

In the arrangement according to the invention, a binary counter is obtained through a novel combination including a magnetostatic relay which is the object of patent applications filed by the Applicant in this and other countries. As is known, the magnetostatic relay is a combination of a magnetic amplifier and of a transistor, the magnetic amplifier output current, which is a function of the ampere-turns delivered by the control windings of the magnetic amplifier is delivered to the base of a transistor which, depending on the value of this current, with respect to a predetermined current level, becomes blocking or conducting to saturation, the output current of the relay itself being a constant D.C. current.

The magnetostatic relay may thus exhibit two stable states: a rest state when the collector current is zero and an operating state when the collector current is a non-zero D.C. current.

According to the invention, a magnetostatic relay comprising two control windings delivering ampere-turns of opposite senses and of values sufficiently different from each other that their difference enables the relay to become operating, is associated to two identical capacitor charge and discharge circuits, each circuit being series-mounted with one of the control windings. The circuit comprising the larger control winding is connected to the relay output through a diode, while the circuit comprising the smaller control winding is connected to the input terminal of the arrangement to which is fed the incoming pulses. Both circuits thus defined are also connected to each other via a diode, the overall arrangement being such that that magnetostatic relay is in the operating state during the two half-waves of an input pulse and is in the rest state during the two half-waves of the subsequent pulse. In this way, when the arrangement is fed with two complete incoming pulses, it delivers only one complete pulse, the half-waves of which each have a time duration equal to two half-waves of the complete incoming pulse.

According to another feature of the invention, several arrangements may be associated in series by connecting the output of one of them to the input of the next one so that the frequency of the output pulses of the last arrangement is equal to the frequency of the input to the first arrangement divided by 2 raised to a power equal to the number of arrangements connected in series.

Another advantage offered by the invention is that it provides a binary counting component with only one input and one output.

Another advantage of the invention is the utilization of a magnetostatic relay which, through the use of several control windings, always makes it possible to meet complex making and breaking conditions for the arrangement.

Another advantage of the arrangement of the invention is its simplicity and its ruggedness, only one transistor being used for each arrangement.

Another advantage of the invention is that, when several arrangements are connected in series, the output pulse delivered may have as long a time duration as required and thus be utilized with and applicable to any standard equipment without special considerations.

These and other features of the invention will be apparent from the following description of an embodiment of the invention, with reference to the accompanying drawings, in which.

Figure 1:
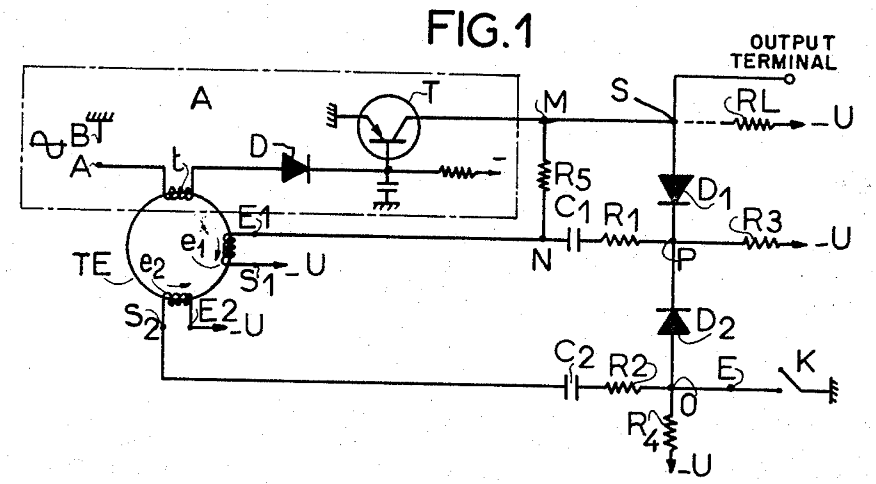
FIGURE 1 shows the arrangement according to the invention.

FIGURE 1, a magnetostatic relay A, constituted by the combination of a magnetic amplifier and a transistor T, feeds the arrangement according to the invention. The magnetostatic relay comprises a magnetic core TE having a rectangular hysteresis characteristic, on which are wound a power winding $t$ and control windings such as $e_1$ and $e_2$. The winding $t$ is fed from an A.C. supply source AB, while the control windings $e_1$ and $e_2$ are fed with D.C. control currents in a manner to be described. Through the diode D, the output current of the magnetic amplifier, the value of which depends upon the algebraic sum of the control ampere-turns, is delivered at the base of a transistor T and renders this transistor conducting or blocking, depending upon whether the base potential becomes lower or higher than that of the emitter. The current which is delivered into the load resistor is either a constant D.C. current, when the transistor is conducting, or a zero current, when the transistor is blocking.

The arrangement according to the invention consists, on the one hand, in providing on the core TE two control windings $e_1$ and $e_2$ delivering ampere-turns of an opposite sense, the ampere-turns generated by the winding $e_1$ being also larger (for instance twice as large) than those generated by the winding $e_2$ and, in addition, of a direction such that the algebraic sum of $e_1$ and $e_2$ will produce a resultant in a direction capable of making the magnetostatic relay come into operation; on the other hand, it consists in providing the following assembly: point S taken on the collector of the transistor T is connected to the negative polarity of a D.C. supply source U through a resistor $R_L$ and to a common point P through a diode $D_1$ mounted in such a direction that its negative terminal is connected to the point P.

Point P is then connected to three branches. The first branch comprises a resistor $R_3$ connected in turn to the negative polarity of the D.C. supply source U. The second branch comprises the series combination of a resistor $R_1$ and a capacitor $C_1$ connected in series through the control winding $e_1$ to the negative polarity of a D.C. supply source U. Lastly, the third branch connects the point P to another common point Q through a diode $D_2$ mounted in such a direction that is negative terminal is connected to point P.

Point Q is itself connected on the one hand to the input terminal E of the arrangement and on the other hand to two branches. The first of these branches comprises a resistor $R_4$, the end of which is connected to the negative polarity of the D.C. voltage supply source U. The second branch comprises a resistor $R_2$ and a capacitor $C_2$ connected in series through the control winding $e_2$ to the negative polarity of a D.C. supply source U.

It is to be noted that both resistors $R_1$ and $R_2$ have essentially the same resistance value and that both capacitors $C_1$ and $C_2$ have essentially the same capacitance value so that the circuits including windings $e_1$ and $e_2$ are essentially matched. The resistance of the windings $e_1$ and $e_2$ are always very small compared to the resistance $R_1$ or $R_2$. The input E is shown connected, by the way of example, to a switch K, the other terminal of which is connected to ground potential. Lastly, the magnetostatic relay is provided with some feedback by connecting point M on the collector of the transistor T through a resistor $R_5$ to a point N located between the winding $e_1$ and the capacitor $C_1$.

The arrangement according to FIGURE 1 operates as follows: in the rest state, the magnetostatic relay delivers no current, the transistor T being blocked. Effectively, both terminals of the winding $e_1$ are connected together via the resistors $R_5$ and $R_L$, and the winding $e_2$ is connected to the capacitor $C_2$, the two plates of which are connected to the same negative pole of the battery U, one through the winding $e_2$ and the other through $R_2$ and $R_4$. When the switch K is open, the capacitor $C_2$ is discharged due to the equal potential —U on both plates thereof. For similar reasons, capacitor $C_1$ is also discharged under these conditions.

Let it be assumed that the switch K is now closed: point Q potential becomes that of ground completing the circuit through source U. Point P will also reach ground potential since the diode $D_2$ is conducting in the proper direction. The equal-capacitance capacitors $C_1$ and $C_2$ are therefore equally charged between voltage —U and ground. An equal current therefore flows in the windings $e_1$ and $e_2$ during charging of $C_1$ and $C_2$; however, since $e_1$ comprises more turns than $e_2$, the ampere-turns generated by $e_1$ will be greater by the amount of difference in the number of turns of the two windings and, moreover, since $e_1$ is wound oppositely to $e_2$ and in such a direction that it will generate a current in winding *t* in the proper direction to operate the transistor T to conduction, the latter changes its state and becomes conductive to saturation. The potential of the collector of transistor T then becomes about that of ground; a feedback current flows through the resistor $R_5$ and the winding $e_1$. This current causes the magnetostatic relay to remain operating even if a certain fall in the ampere-turns occurs. Through diode $D_1$ which is conducting in the direction from S to P, point P reaches the ground potential of point S derived through transistor T.

Now, let the switch K be opened. Capacitor $C_2$ gets discharged through the resistors $R_2$ and $R_4$ and the winding $e_2$; since the discharge current is of opposite direction to that of the charge current, it generates positive ampere-turns which tend to keep the relay operating. On the other hand, point P remains at the potential of point S, since the transistor T is still conducting. Consequently, the capacitor $C_1$ remains charged between point P potential (which is that of earth) and the negative potential (—U) of the winding $e_1$.

If switch K is closed again, point Q potential again becomes that of ground; the capacitor $C_2$ gets charged while the charge on capacitor $C_1$ itself remains unchanged. The charge current of the capacitor $C_2$ generates negative ampere-turns in the winding $e_2$ so that the feedback ampere-turns of the winding $e_1$ are no longer sufficient to keep the magnetostatic relay operating and so, the latter is released. Point S, at the collector, comes back to its negative rest potential as soon as transistor T cuts off while point P potential remains that of earth since, under these conditions, the diode $D_1$ is nonconducting for the potentials of points S and P.

The switch K is then re-opened. The capacitor $C_2$ gets discharged, generating positive ampere-turns which tend to make the relay A operating, but the capacitor $C_1$ also gets discharged since point P is no longer held at a positive potential, either via point Q or via point S. The discharge current of the capacitor $C_1$ generates negative empere-turns which tend to bring the relay to rest; since these ampere-turns override those generated by the discharge of $C_2$, the neg resultant remains negative and the relay remains at rest. The discharge circuit path for the capacitor $C_1$ is as follows: right-hand plate of $C_1$, resistor $R_1$, point P, resistor $R_3$, —U, point $S_1$, winding $e_1$, point $E_1$ and left hand plate of $C_1$. As a result, when both capacitors $C_1$ and $C_2$ are discharged, the arrangement is back to critical conditions. Assuming that a complete pulse is made up of a positive half-wave (switch K closed) and of a negative half-wave (switch K open, point E connection made at least through $R_4$,) it is seen that point S potential takes up a positive value all along the two successive half-waves of a complete input pulse, and a negative value during the two successive half-waves of a following pulse. Thus, a complete output pulse is generated at point S during the time two fundamental pulses are applied at the input: in other words, the output pulses frequency is half that of the input pulses and consequently, the arrangement does work as a frequency divider.

Figure 2:
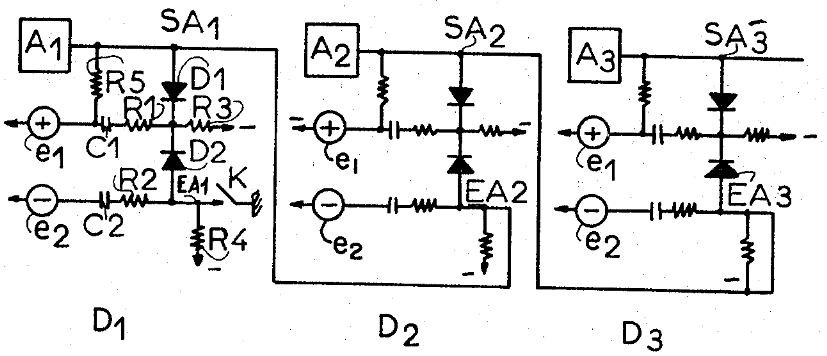
FIGURE 2 shows by way of example a binary counting assembly achieved by connecting in series several arrangements according to the invention.

FIGURE 2 shows a binary counter circuitry made up of a certain number *n* of arrangements according to the invention and such as that shown in FIGURE 1. The boxes $A_1$, $A_2$, $A_3$, etc. each correspond to the magnetostatic relay A in the arrangement of FIGURE 1. The input EA1 of the arrangement $D_1$ is connected to the earth via the switch K, while the output SA1 of the same arrangement $D_1$ is connected to the input EA2 of the arrangement $D_2$. The output SA2 of the arrangement $D_2$ is connected to the input EA3 of the arrangement $D_3$ and so on.; finally, there is an input EA1 for arrangement $D_1$ and an output SA*n* for the arrangement D*n*.

Under these conditions, when the frequency of the fundamental pulses is $f$ at the input of the arrangement $D_1$, the frequencies are $f/2$ at the output of the same arrangement, $f/4$ at the output of arrangement $D_2$, $f/8$ at the output of the arrangement $D_3$ and, generally speaking, $f/2^n$ at the output of the arrangement D*n*.

Figure 3:
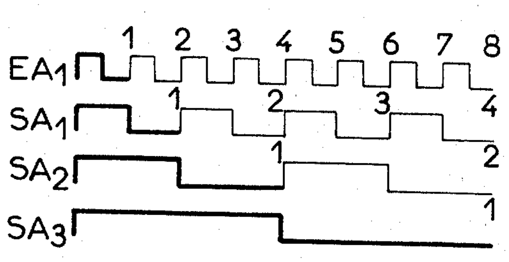
FIGURE 3 shows the shape of successive pulses delivered when several arrangements are connected in series.

This operation is further illustrated by FIGURE 3. EA1 shows the fundamental pulses such as they are generated by a switch K at the input EA1 of the arrangement D1; the first pulse of each sequence is shown by heavy lines. It is seen that the complete pulse delivered at SA1 lasts twice as long as the fundamental pulse, that the pulse delivered at SA2 lasts four times as long as the fundamental pulse, etc., and that consequently, any arrangement in the *n*th position will deliver a pulse lasting $2^n$ times as long as the fundamental pulse.

It is evident that various changes and modifications may be made in the embodiment of the invention herein illustrated and described without departing from the spirit and scope of the invention. In particular, NPN type transistors may be substituted for PNP type transistors by reversing the current supply polarities and the direction of the diodes. Likewise, instead of using a resistor $R_5$, it is possible to provide some feedback for the relay via a magnetic amplifier feedback winding, the embodiment more particularly illustrated and described herein being given only by way of example.

It should also be apparent that the switch K is merely a schematic representation of the source of input signals, which in the illustrated example pertaining to a frequency divider represents the signal source whose frequency is to be divided. This element may obviously take the form of any device providing a binary output sufficient to alternately connect point E to ground potential; as also apparent, the period of the switch K may be regular or irregular.

While I have shown and described one embodiment in accordance with the present invention, it is understood that the same is not limited to thereto but is susceptible of numerous changes and modifications as known to a person skilled in the art; and I, therefore, do not wish to be limited to the details shown and described herein but intend to cover all such changes and modifications as are encompassed by the scope of the appended claims.

I claim:

1. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level, an electronic divider circuit having a single input and being magnetically coupled to said magnetostatic relay for binary control thereof, said electronic divider circuit including first and second capacitor charge and discharge circuits, said magnetic amplfier having first and second control windings connected respectively to said first and second capacitor charge and discharge circuits, first diode means interconnecting said first and second capacitor charge and discharge circuits, and an input terminal connected to one end of said first diode means, second diode means interconnecting said first capacitor charge and discharge circuit and said transistor switch means, said first and second control windings being wound in opposite senses, and said first control winding having more turns than said second control winding, said first and second diode means being connected to each other in opposite senses.

2. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level, an electronic divider circuit having a single input and being magnetically coupled to said magnetostatic relay for binary control thereof, said electronic divider circuit including first and second capacitor charge and discharge circuits, said magnetic amplifier having first and second control windings connected respectively to said first and second capacitor charge and discharge circuits, first diode means interconnecting said first and second capacitor charge and discharge circuits, and an input terminal connected to one end of said first diode means, second diode means interconnecting said first capacitor charge and discharge circuit and said transistor switch means, said first and second control windings being wound in opposite senses, and said first control winding have more turns than said second control winding, said first and second diode means being connected to each other in opposite senses, the ratio of turns of said first and second control windings providing an excess of control of said first control winding over said second control winding sufficient to activate said transistor switch means, means connected to said input terminal for applying thereto successively one of two different potentials of an incoming signal.

3. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level, an electronic divider circuit having a single input and being magnetically coupled to said magnetostatic relay for binary control thereof, said electronic divider circuit including first and second capacitor charge and discharge circuits, said magnetic amplifier having first and second control windings connected respectively to said first and second capacitor charge and discharge circuits, a first potential source connected to one end of each of said first and second control windings, said first and second capacitor charge and discharge circuits each including a capacitor connected in series with a pair of resistors, the capacitor and two resistors in each circuit having matched impedance characteristics, first diode means interconnecting the points of connection of said two resistors in each capacitor charge and discharge circuit, second diode means interconnecting the point of connection of said two resistors of said first capacitor charge and discharge circuit and said transistor switch means, said first and second diode means being connected by their negative terminals to said first capacitor charge and discharge circuit.

4. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level.

an electronic divider circuit having a single input and being magnetically coupled to said magnetostatic relay for binary control thereof, said electronic divider circuit including first and second capacitor charge and discharge circuits, said magnetic amplifier having first and second control windings connected respectively to said first and second capacitor charge and discharge circuits, a first potential source connected to one end of each of said first and second control windings, said first and second capacitor charge and discharge circuits each including a capacitor connected in series with a pair of resistors, the capacitor and two resistors in each circuit having matched impedance characteristics, first diode means interconnecting the point of connection of said two resistors in each capacitor charge and discharge circuit, second diode means interconnecting the point of connection of said two resistors of said first capacitor charge and discharge circuit and said transistor switch means, said first and second diode means being connected by their negative terminals to said first capacitor charge and discharge circuit, said transistor switch means including a transistor having base, emitter and collector electrodes, said collector being connected to said first potential source and said emitter being connected to ground potential, said first diode means connecting said collector electrode to said point of connection of said two resistors in said first capacitor charge and discharge circuit for placing said point at ground potential upon activation of said transistor switch means.

5. A frequency divider arrangement particularly for use as a binary counter comprising a magnetostatic relay including a magnetic amplifier and a transistor switch means connected to said magnetic amplifier providing an output signal at saturation level in response to current level and being cut-off in response to current control above said predetermined current level, an electronic voltage divider circuit having a single input and being magnetically coupled to said magnetostatic relay for binary control thereof, said electronic divider circuit including first and second capacitor charge and discharge circuits, said magnetic amplifier having first and second control windings connected respectively to said first and second capacitor charge and discharge circuits, first diode means interconnecting said first and second capacitor charge and discharge circuits, and an input terminal connected to one end of said first diode means, second diode means interconnecting said first capacitor charge and discharge circuit and said transistor switch means, said first and second control windings being wound in opposite senses, and said first control winding having more turns than said second control winding.

6. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level, an electronic divider circuit having a single input and being magnetically coupled to said magnetostatic relay for binary control thereof, said electronic divider circuit including first and second capacitor charge and discharge circuits, said magnetic amplifier having first and second control windings connected respectively to said first and second capacitor charge and discharge circuits, first diode means interconnecting said first and second capacitor charge and discharge circuits, and an input terminal connected to one end of said first diode means, second diode means interconnecting said first capacitor charge and discharge circuit and said transistor switch means, said first and second diode means being connected to each other in opposite senses.

7. A frequency divider arrangement as defined in claim 6 and further including feed-back circuit means interconnecting said transistor switch means and said first control winding independently of said first diode means.

8. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level, an electronic divider circuit having a single input and being magnetically coupled to said magnetostatic relay for binary control thereof, said electronic divider circuit including first and second capacitor charge and discharge circuits, said magnetic amplifier having first and second control windings connected respectively to said first and second capacitor charge and discharge circuits, said first and second control windings being wound in opposite senses and said first control winding having more turns than said second control winding, the ratio of turns of said first and second control windings providing an excess of control of said first control winding over said second control winding sufficient to activate said transistor switch means, and means for selectively completing connection of said first and second capacitor charge and discharge circuits to a common source of potential.

9. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level, an electronic divider circuit having a single input and being magnetically coupled to said magnetostatic relay for binary control thereof, said electronic divider circuit including first and second capacitor charge and discharge circuits, said magnetic amplifier having first and second control windings connected respectively to said first and second capacitor charge and discharge circuits, a first potential source connected to one end of each of said first and second control windings, said first and second capacitor charge and discharge circuits each including a capacitor connected in series with a pair of resistors, the capacitor and two resistors in each circuit having matched impedance characteristics.

10. A frequency divider arrangement as defined in claim 9 wherein said first and second control windings are wound in opposite senses, and said first control windings has more turns than said second control winding.

11. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level, an electronic divider circuit having a single input and being magnetically coupled to said magnetostatic relay for binary control thereof, said electronic divider circuit including first and second capacitor charge and discharge circuits, said magnetic amplifier having first and second control windings connected respectively to said first and second capacitor charge and discharge circuits, a first potential source conected to one end of each of said first and second control windings, said first and second capacitor charge and discharge circuits each including a capacitor connected in series with a pair of resistors, the capacitor and two resistors in each circuit having matched impedance characteristics, first diode means interconnecting the point of connection of said two resistors in each capacitor charge and discharge circuit, second diode means interconnecting the point of connection of said two resistors of said first capacitor charge and discharge circuit and said transistor switch means.

12. A frequency divider arrangement particularly for use as a binary counter comprising a magnetostatic relay including a magnetic amplifier and a transistor switch means connected to said magnetic amplifier providing an output signal at saturation level in response to current control from said magnetic amplifier below a predetermined current level and being cut-off in response to current control above said predetermined current level, an electronic divider circuit having a single input and being magnetically coupled to said magnetostatic relay for binary control thereof, said electronic divider circuit including first and second capacitor charge and discharge ciruits, said magnetic amplifier having first and second control windings connected respectively to said first and second capacitor charge and discharge circuits, a first potential source connected to one end of each of said first and second control windings, said first and second capacitor charge and discharge circuits each including a capacitor conneted in series with a pair of resistors, the capacitor and two resistors in each circuit having matched impedance characteristics, first diode means interconnecting the points of connection of said two resistors in each capacitor charge and discharge circuit; second diode means interconnecting the point of connection of said two resistors of said first capacitor charge and discharge circuit and said transistor switch means, said first and second diode means being connected by their negative terminals to said first capacitor charge and discharge circuit, said first and second control windings being wound in opposite senses and said first control winding having more turns than said second control windings, the ratio of turns of said first and second control windings providing an excess of control of said first control winding over said second control winding sufficient ot activate said transistor switch means, means connected to said input terminal for applying thereto successively one of two different potentials of an incoming signal, feedback circuit means interconnecting said transistor switch means and said first contact winding independently of said first diode means.

References Cited

UNITED STATES PATENTS

| | | | |
|---|---|---|---|
| 2,902,609 | 9/1959 | Ostroff et al. | 307—225 |
| 2,955,211 | 10/1960 | Ostroff. | |
| 3,053,992 | 9/1962 | Todman | 307—282 X |
| 3,063,038 | 11/1962 | Davis et al. | |

JOHN S. HEYMAN, *Primary Examiner.*